(12) United States Patent
Maruyama et al.

(10) Patent No.: US 11,898,940 B2
(45) Date of Patent: Feb. 13, 2024

(54) LEAK DETECTION SYSTEM AND INSPECTION METHOD FOR THE SYSTEM

(71) Applicant: EBARA CORPORATION, Tokyo (JP)

(72) Inventors: Toru Maruyama, Tokyo (JP);
Mitsunori Komatsu, Tokyo (JP);
Keisuke Kamiki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 315 days.

(21) Appl. No.: 17/384,000

(22) Filed: Jul. 23, 2021

(65) Prior Publication Data

US 2022/0034745 A1    Feb. 3, 2022

(30) Foreign Application Priority Data

Jul. 28, 2020    (JP) .................................. 2020-127424

(51) Int. Cl.
| | |
|---|---|
| *G01M 3/28* | (2006.01) |
| *B24B 37/005* | (2012.01) |
| *G01M 3/18* | (2006.01) |
| *G01M 3/26* | (2006.01) |

(52) U.S. Cl.
CPC ......... *G01M 3/2807* (2013.01); *B24B 37/005* (2013.01); *G01M 3/18* (2013.01); *G01M 3/182* (2013.01); *G01M 3/183* (2013.01); *G01M 3/26* (2013.01); *G01M 3/28* (2013.01); *G01M 3/2846* (2013.01)

(58) Field of Classification Search
CPC ...... G01M 3/2807; G01M 3/18; G01M 3/182; G01M 3/183; G01M 3/26; G01M 3/28; G01M 3/2846; B24B 37/005; G01N 2223/647

USPC ...................................................... 73/40–49.3
See application file for complete search history.

(56) References Cited

U.S. PATENT DOCUMENTS

| | | | |
|---|---|---|---|
| 7,454,956 B1 * | 11/2008 | LoPresti ............. | G01M 3/3227 73/49.3 |
| 2009/0145200 A1 * | 6/2009 | Kumar ................ | G01M 3/3227 73/40.7 |

FOREIGN PATENT DOCUMENTS

| | | |
|---|---|---|
| JP | 2009-222434 A | 10/2009 |
| JP | 5147473 B2 | 2/2013 |
| JP | 2020-003843 A | 1/2020 |

\* cited by examiner

*Primary Examiner* — Herbert K Roberts
*Assistant Examiner* — Anthony W Megna Fuentes
(74) *Attorney, Agent, or Firm* — BakerHostetler

(57) ABSTRACT

A method of inspecting a leak detection system in a short time is disclosed. The leak detection system includes a leak detection line, an on-off valve, a flow mater, an operation controller configured to detect a fluid leak from a fluid line based on a first flow rate measured by the flow mater, a drain line, and a drain valve attached to the drain line. The inspection method includes: opening the on-off valve and the drain valve, with a supply valve and a return valve closed; measuring a second flow rate of fluid in the leak detection line by the flow mater; and determining that the leak detection system has a defect when the second flow rate is lower than a predetermined reference value.

10 Claims, 10 Drawing Sheets

LEAK DETECTION SYSTEM AND INSPECTION METHOD FOR THE SYSTEM

CROSS REFERENCE TO RELATED APPLICATION

This document claims priority to Japanese Patent Application Number 2020-127424 filed Jul. 28, 2020, the entire contents of which are hereby incorporated by reference.

BACKGROUND

A CMP (Chemical Mechanical Polishing) apparatus is used for polishing a surface of a wafer in manufacturing of semiconductor devices. The CMP apparatus is configured to hold and rotate the wafer with a polishing head, and press the wafer against a polishing pad on a rotating polishing table to polish the surface of the wafer. During polishing, a polishing liquid (or slurry) is supplied onto the polishing pad, so that the surface of the wafer is planarized by the chemical action of the polishing liquid and the mechanical action of the abrasive particles contained in the polishing liquid and/or the polishing pad.

A polishing rate of the wafer depends not only on a polishing load on the wafer pressed against the polishing pad, but also on a surface temperature of the polishing pad. This is because the chemical action of the polishing liquid on the wafer depends on the temperature. Therefore, in the manufacturing of semiconductor devices, it is important to maintain an optimum surface temperature of the polishing pad during polishing of the wafer in order to increase the polishing rate of the wafer, and to keep the increased polishing rate constant.

From this viewpoint, a pad-temperature regulating apparatus is conventionally used for regulating a surface temperature of a polishing pad. FIG. 10 is a schematic view of an example of a conventional pad-temperature regulating apparatus. As shown in FIG. 10, the pad-temperature regulating apparatus includes a heat exchanger 111 configured to exchange heat with a polishing pad 103, and a fluid line 105 in which the heat exchanger 111 is arranged. The fluid line 105 includes a fluid supply pipe 112 and a fluid discharge pipe 150 coupled to the heat exchanger 111. The fluid supply pipe 112 branches into a hot-water supply pipe 115 coupled to a hot-water supply source, and a cold-water supply pipe 116 coupled to a cold-water supply source.

A hot-water regulating valve 120 and a cold-water regulating valve 121 are attached to the hot-water supply pipe 115 and the cold-water supply pipe 116, respectively. A controller 130 controls operations of the hot-water regulating valve 120 and the cold-water regulating valve 121 so as to adjust a flow rate of hot water flowing through the hot-water supply pipe 115 and a flow rate of cold water flowing through the cold-water supply pipe 116. Changing the flow rate of hot water and the flow rate of cold water causes a change in temperature of the heat exchanger 111. Heat exchange is performed between the heat exchanger 111 and the polishing pad 103, and as a result, the surface temperature of the polishing pad 103 changes.

If a fluid leaks from the fluid line 105 including the heat exchanger 111, the leaked fluid may contact the surface of the polishing pad 103. If the fluid that has leaked from the fluid line 105 contacts the polishing pad 103 during polishing of a wafer, a polishing rate of the wafer may decrease and/or the wafer may be contaminated. Therefore, it is necessary to periodically inspect for the fluid leak from the fluid line 105.

As a means for detecting a fluid leak, a method of using a leak detection system with a leak detection line coupled to the fluid line 105 is described in Japanese Laid-open Patent Publication No. 2020-003843. A flow meter located in the leak detection line measures a flow rate of a fluid flowing through the leak detection line. When the fluid leaks from the fluid line, the flow rate acquired by the flow meter becomes higher than a predetermined threshold value, so that the fluid leak can be determined.

However, in order to accurately detect the fluid leak by the above method, it is necessary to confirm that the leak detection system itself has no defect. The flow meter disposed in the leak detection system may use a micro flow meter which can detect even a minute leak. There are various types of micro flow meters. For example, in a case of using a gear-type micro flow meter, the flow rate cannot be measured accurately when wear of gears progresses. Specifically, the gears do not mesh normally due to wear, and the micro flow meter may indicate zero regardless of an actual flow rate. Therefore, if there is a defect with the micro flow meter, the fluid leak from the fluid line cannot be detected accurately.

Thus, conventionally, the operation of the CMP apparatus was periodically stopped, and maintenance of the micro flow meter was conducted. In particular, a dedicated jig is attached to the micro flow meter to check that the output of the micro flow meter is normal. Alternatively, two micro flow meters are attached to check that measured flow rates indicate the same value. However, such checking operations are time-consuming and result in a lowered throughput of the CMP apparatus.

The defect of the leak detection system may be due to a fluid leak from the leak detection line. If the fluid leaks from the leak detection line, it becomes impossible to accurately detect the fluid leak from the fluid line. In addition, the fluid that has leaked from the leak detection line may contact the surface of the polishing pad, thus causing a decrease in the polishing rate and/or wafer contamination. It is therefore desired to detect the defect of the leak detection system as quickly as possible without causing a lowered throughput of the CMP apparatus.

SUMMARY

According to embodiments, there are provided a method of inspecting a leak detection system in a short time and a leak detection system which can perform such inspection method.

Embodiments, which will be described below, relate to a method of detecting a defect of a fluid leak detection system.

In an embodiment, there is provided an inspection method for a leak detection system configured to detect a fluid leak from a fluid line, comprising: measuring a second flow rate of a fluid in a leak detection line of the leak detection system by a flow mater; and determining that the leak detection system has a defect when the second flow rate is lower than a predetermined reference value, the leak detection system including: the leak detection line coupled to the fluid line extending between a supply valve and a return valve; an on-off valve attached to the leak detection line; the flow mater configured to measure a flow rate of fluid flowing through the leak detection line; an operation controller configured to detect the fluid leak from the fluid lines based on a first flow rate measured by the flow mater; a drain line communicating with the fluid line and the leak detection line, the drain line being located downstream of the flow mater; and a drain valve attached to the drain line.

In an embodiment, the predetermined reference value is equal to or lower than a flow rate of the fluid flowing through the drain line when the leak detection system has no defect.

In an embodiment, the inspection method is performed after the leak detection system is determined to have no fluid leak from the fluid line; and the leak detection system is configured to: close the supply valve, the return valve, and the drain valve; open the on-off valve; measure the first flow rate by the flow mater; and determine no fluid leak from the fluid line when the first flow rate is equal to or lower than a predetermined threshold value.

In an embodiment, the fluid line includes a heat exchanger; the supply valve is located upstream of the heat exchanger; and the return valve is located downstream of the heat exchanger.

In an embodiment, the heat exchanger is disposed on a polishing pad of a polishing apparatus.

In an embodiment, there is provided an inspection method for a leak detection system configured to detect a fluid leak from a fluid line, comprising: measuring a second flow rate of a fluid in a leak detection line of the leak detection system by a flow mater, with an on-off valve closed, the on-off valve being attached to the leak detection line; and determining that the leak detection system has a defect when the second flow rate is out of a predetermined range, the leak detection system including: the leak detection line coupled to the fluid line extending between a supply valve and a return valve; the on-off valve attached to the leak detection line; the flow mater configured to measure a flow rate of fluid flowing through the leak detection line, and an operation controller configured to detect the fluid leak from the fluid line based on a first flow rate measured by the flow mater.

In an embodiment, the fluid line includes a heat exchanger; the supply valve is located upstream of the heat exchanger; and the return valve is located downstream of the heat exchanger.

In an embodiment, the heat exchanger is disposed on a polishing pad of a polishing apparatus.

In an embodiment, there is provided a leak detection system for detecting a fluid leak from a fluid line, comprising: a leak detection line coupled to the fluid line extending between a supply valve and a return valve; an on-off valve attached to the leak detection line; a flow mater configured to measure a flow rate of fluid flowing through the leak detection line; an operation controller configured to detect the fluid leak from the fluid line based on a first flow rate measured by the flow mater; a drain line communicating with the fluid line and the leak detection line, the drain line being located downstream of the flow mater; and a drain valve attached to the drain line, the operation controller being configured to: close the supply valve and the return valve; open the on-off valve and the drain valve; obtain, from the flow mater, a measured value of a second flow rate of fluid in the leak detection line; and determine that the leak detection system has a defect when the second flow rate is lower than a predetermined reference value.

In an embodiment, the predetermined reference value is equal to or lower than the flow rate of the fluid flowing through the drain line when the leak detection system has no defect.

In an embodiment, the operation controller is configured to: close the supply valve, the return valve, and the drain valve; open the on-off valve; obtain, from the flow mater, a measured value of the first flow rate of fluid in the leak detection line; determine no fluid leak from the fluid line when the first flow rate is equal to or lower than a predetermined threshold value; then open the drain valve, with the supply valve and the return valve closed, and with the on-off valve opened; obtain, from the flow mater, a measured value of the second flow rate of fluid in the leak detection line; and determine that the leak detection system has a defect when the second flow rate is lower than the predetermined reference value.

In an embodiment, the fluid line includes a heat exchanger; the supply valve is located upstream of the heat exchanger; and the return valve is located downstream of the heat exchanger.

In an embodiment, the heat exchanger is disposed on a polishing pad of a polishing apparatus.

In an embodiment, there is provided a leak detection system for detecting a fluid leak from a fluid line, comprising: a leak detection line coupled to the fluid line extending between a supply valve and a return valve; an on-off valve attached to the leak detection line; a flow mater configured to measure a flow rate of fluid flowing through the leak detection line; and an operation controller configured to detect the fluid leak from the fluid line based on a first flow rate measured by the flow mater, the operation controller being configured to: close the on-off valve; obtain, from the flow mater, a measured value of a second flow rate of fluid in the leak detection line; and determine that the leak detection system has a defect when the second flow rate is out of a predetermined range.

In an embodiment, the fluid line includes a heat exchanger; the supply valve is located upstream of the heat exchanger; and the return valve is located downstream of the heat exchanger.

In an embodiment, the heat exchanger is disposed on a polishing pad of a polishing apparatus.

According to the above-described embodiments, the leak detection system can be inspected for a defect in a short time without the use of dedicated jigs, etc.

DESCRIPTION OF EMBODIMENTS

Embodiments will now be described with reference to the drawings.

Figure 1:
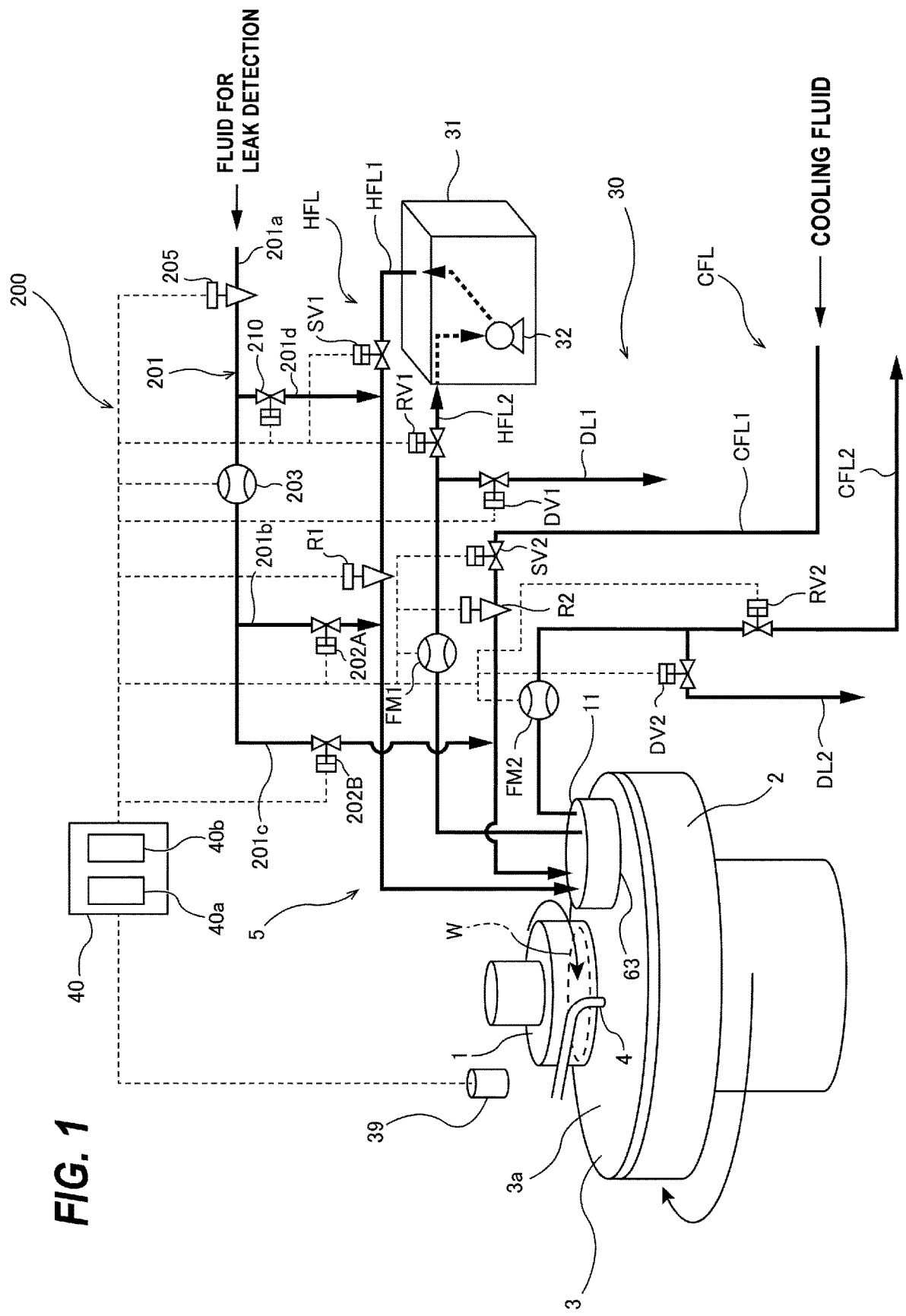
FIG. 1 is a schematic diagram of an embodiment of a polishing apparatus.

FIG. 1 is a schematic diagram showing an embodiment of a polishing apparatus. As shown in FIG. 1, the polishing apparatus includes a polishing head 1 configured to hold and rotate a wafer W which is an example of a substrate, a polishing table 2 that supports a polishing pad 3, a polishing-liquid supply nozzle 4 configured to supply a polishing liquid (e.g. a slurry) onto a surface of the polishing pad 3, and a pad-temperature regulation system 5 configured to regulate a surface temperature of the polishing pad 3. The surface (upper surface) 3a of the polishing pad 3 provides a polishing surface configured to polish the wafer W.

The polishing head 1 is vertically movable, and is rotatable about its axis in a direction indicated by arrow. The wafer W is held on a lower surface of the polishing head 1 by, for example, vacuum suction. A motor (not shown) is coupled to the polishing table 2, so that the polishing table 2 can rotate in a direction indicated by arrow. As shown in FIG. 1, the polishing head 1 and the polishing table 2 rotate in the same direction. The polishing pad 3 is attached to an upper surface of the polishing table 2.

Polishing of the wafer W is performed as follows. The wafer W, to be polished, is held by the polishing head 1, and is rotated by the polishing head 1. The polishing pad 3 is rotated together with the polishing table 2. The polishing liquid is supplied from the polishing-liquid supply nozzle 4 onto the surface 3a of the polishing pad 3, and the surface of the wafer W is then pressed by the polishing head 1 against the surface 3a (i.e., the polishing surface) of the polishing pad 3. The surface of the wafer W is polished by the sliding contact with the polishing pad 3 in the presence of the polishing liquid. The surface of the wafer W is planarized by the chemical action of the polishing liquid and the mechanical action of abrasive particles contained in the polishing liquid and/or the polishing pad 3.

The pad-temperature regulation system 5 includes a heat exchanger 11 having flow passages formed therein through which fluids flow to regulate the surface temperature of the polishing pad 3. The pad-temperature regulation system 5 further includes a fluid supply system 30 for supplying a heating fluid having a regulated temperature and a cooling fluid having a regulated temperature into the heat exchanger 11. The heat exchanger 11 has a bottom surface 63 facing the surface 3a of the polishing pad 3. The heat exchanger 11 is located above the polishing table 2 and is disposed on the surface 3a of the polishing pad 3.

The fluid supply system 30 includes a heating-fluid supply tank 31 as a heating-fluid supply source for holding the heating fluid having a regulated temperature therein, and a heating-fluid line HFL in which the heat exchanger 11 is disposed. The heating-fluid line HFL includes the heat exchanger 11, a heating-fluid supply line HFL1, and a heating-fluid return line HFL2. Both the heating-fluid supply line HFL1 and the heating-fluid return line HFL2 couple the heating-fluid supply tank 31 to the heat exchanger 11. Ends of the heating-fluid supply line HFL1 and the heating-fluid return line HFL2 are coupled to the heating-fluid supply tank 31, and other ends are coupled to the heat exchanger 11.

A pump 32, which is configured to circulate the heating fluid between the heating-fluid supply tank 31 and the heat exchanger 11, is disposed in the heating-fluid supply tank 31. When the pump 32 is in operation, the heating fluid having a regulated temperature is supplied from the heating-fluid supply tank 31 to the heat exchanger 11 through the heating-fluid supply line HFL1, flows in the heat exchanger 11, and is returned to the heating-fluid supply tank 31 from the heat exchanger 11 through the heating-fluid return line HFL2. In this way, the heating fluid circulates between the heating-fluid supply tank 31 and the heat exchanger 11. The heating-fluid supply tank 31 has a heater (not shown), so that the heating fluid is heated by the heater to have a predetermined temperature (e.g., 80° C.).

A first supply valve SV1 and a first flow-rate control valve R1 are disposed in the heating-fluid supply line HFL1. The first supply valve SV1 is located upstream of the heat exchanger 11, and the first flow-rate control valve R1 is located between the heat exchanger 11 and the first supply valve SV1. In this specification, "upstream" means upstream in the flow direction of the fluid, and "downstream" means downstream in the flow direction of the fluid.

The first supply valve SV1 is a valve configured to open and close a flow passage of the heating-fluid supply line HFL1, and is located adjacent to the heating-fluid supply tank 31. The first flow-rate control valve R1 is a flow-rate regulating device configured to regulate the flow rate of the fluid flowing through the heating-fluid supply line HFL1. An example of the first flow-rate control valve R1 includes a mass flow controller.

A first return valve RV1 and a first flow meter FM1 are disposed in the heating-fluid return line HFL2. The first return valve RV1 is configured to open and close a flow passage of the heating-fluid return line HFL2, and the first flow meter FM1 is configured to measure the flow rate of the fluid flowing through the heating-fluid return line HFL2. The first flow meter FM1 is located upstream of the first return valve RV1. The first return valve RV1 is located adjacent to the heating-fluid supply tank 31.

A first drain line DL1, which is configured to drain the fluid flowing through the heating-fluid return line HFL2 to the outside, is coupled to the heating-fluid return line HFL2. The first drain line DL1 is located between the first flow meter FM1 and the first return valve RV1. A first drain valve DV1, which is configured to open and close a flow passage of the first drain line DL1, is coupled to the first drain line DLL. The first drain valve DV1 is usually closed.

The fluid supply system 30 further includes a cooling-fluid line CFL in which the heat exchanger 11 is disposed. The cooling-fluid line CFL includes the heat exchanger 11, a cooling-fluid supply line CFL1, and a cooling-fluid return line CFL2. Both the cooling-fluid supply line CFL1 and the cooling-fluid return line CFL2 are coupled to the heat exchanger 11. The cooling-fluid supply line CFL1 is coupled to a cooling-fluid supply source (e.g., a cold-water supply source) provided in a factory in which the polishing apparatus is installed. The cooling fluid is supplied to the heat exchanger 11 through the cooling-fluid supply line CFL1, flows in the heat exchanger 11, and is drained from the heat exchanger 11 through the cooling-fluid return line CFL2. In one embodiment, the cooling fluid that has flowed through the heat exchanger 11 may be returned to the cooling-fluid supply source through the cooling-fluid return line CFL2.

A second supply valve SV2 and a second flow-rate control valve R2 are disposed in the cooling-fluid supply line CFL1. The second supply valve SV2 is located upstream of the heat exchanger 11, and the second flow-rate control valve R2 is located between the heat exchanger 11 and the second supply valve SV2. The second supply valve SV2 is a valve configured to open and close a flow passage of the cooling-fluid supply line CFL1 and the second flow-rate control valve R2 is a flow-rate regulating device configured to regulate the flow rate of the fluid flowing through the cooling-fluid supply line CFL1. An example of the second flow-rate control valve R2 includes a mass flow controller.

A second return valve RV2 and a second flow meter FM2 are disposed in the cooling-fluid return line CFL2. The second return valve RV2 is configured to open and close a flow passage of the cooling-fluid return line CFL2, and the second flow meter FM2 is configured to measure the flow rate of the fluid flowing through the cooling-fluid return line CFL2. The second flow meter FM2 is located upstream of the second return valve RV2.

A second drain line DL2, which is configured to drain the fluid flowing through the cooling-fluid return line CFL2 to the outside, is coupled to the cooling-fluid return line CFL2. The second drain line DL2 is located between the second flow meter FM2 and the second return valve RV2. A second drain valve DV2, which is configured to open and close the flow passage of the second drain line DL2, is disposed in the second drain line DL2. The second drain valve DV2 is usually closed.

The fluid supply system 30 of the polishing apparatus according to this embodiment includes a plurality of fluid lines (i.e., the heating-fluid line HFL and the cooling-fluid line CFL). In one embodiment, the fluid supply system 30 may include either the heating-fluid line HFL or the cooling-fluid line CFL, or may further include one or more fluid lines different from the heating-fluid line HFL and the cooling-fluid line CFL. Specifically, the fluid supply system 30 is not limited particularly as long as it includes at least one fluid line.

The pad-temperature regulation system 5 further includes a pad-temperature measuring device 39 for measuring a surface temperature of the polishing pad 3 (which may hereinafter be referred to as a pad surface temperature). The pad-temperature measuring device 39 is disposed above the surface 3a of the polishing pad 3, and is configured to measure the surface temperature of the polishing pad 3 in a non-contact manner. The pad-temperature measuring device 39 is coupled to an operation controller 40. The operation controller 40 operates or manipulates the first flow-rate control valve R1 and the second flow-rate control valve R2 based on the pad surface temperature measured by the pad-temperature measuring device 39.

The operation controller 40 is constituted by at least one computer. The operation controller 40 includes a memory 40a in which program is stored, and a processor 40b for performing arithmetic operation according to instructions included in the program. The memory 40a includes a main memory, such as a random access memory (RAM), and an auxiliary memory, such as a hard disk drive (HDD) or a solid state drive (SSD). Examples of the processor 40b include a CPU (central processing unit) and a GPU (graphic processing unit). However, the specific configuration of the operation controller 40 is not limited to this example.

The operation controller 40 is configured to determine an operation amount (also referred to as a control variable or manipulated variable) for the first flow-rate control valve R1 and an operation amount (also referred to as a control variable or manipulated variable) for the second flow-rate control valve R2 required to eliminate a difference between a preset target temperature and the surface temperature of the polishing pad 3. The operation amount for the first flow-rate control valve R1 and the operation amount for the second flow-rate control valve R2 are transmitted to the first flow-rate control valve R1 and the second flow-rate control valve R2, respectively.

The operation amount for the first flow-rate control valve R1 and the operation amount for the second flow-rate control valve R2 are, in other words, valve opening degrees. When the operation controller 40 regulates the valve opening degree of the first flow-rate control valve R1, the flow rate of the heating fluid flowing through the heating-fluid supply line HFL1 is regulated. Similarly, when the operation controller 40 regulates the valve opening degree of the second flow-rate control valve R2, the flow rate of the cooling fluid flowing through the cooling-fluid supply line CFL1 is regulated.

The heating-fluid line HFL and the cooling-fluid line CFL are completely independent pipes. Therefore, the heating fluid and the cooling fluid are supplied to the heat exchanger 11 without being mixed with each other, and discharged from the heat exchanger 11. The heat exchanger 11 has a heating-flow passage and a cooling-flow passage (not shown) therein. The heating-flow passage and the cooling-flow passage are parts of the heating-fluid line HFL and the cooling-fluid line CFL, respectively. In this embodiment, the bottom surface 63 of the heat exchanger 11 has a circular shape. In one embodiment, the bottom surface 63 may have a polygonal shape, such as a quadrangular shape, a pentagonal shape, or the like. A material forming the heating-flow passage, the cooling-flow passage, and the bottom surface 63a may be a material having excellent thermal conductivity, abrasion resistance, and corrosion resistance, such as SiC or alumina.

The heating-flow passage and the cooling-flow passage are completely separated and adjacent to each other in the heat exchanger 11, so that the heating fluid and the cooling fluid are not mixed. Most of the bottom surface 63 of the heat exchanger 11 lies under the heating-flow passage and cooling-flow passage. This arrangement can enable the heat exchanger 11 to control the temperature of the surface 3a of the polishing pad 3 by both the heating fluid and the cooling fluid with the entirety of the bottom surface 63, and can provide a uniform temperature distribution.

While the polishing table 2 and the polishing pad 3 are rotating, the heating fluid and the cooling fluid flowing in the heat exchanger 11 perform the heat exchange with the polishing pad 3. During polishing of the wafer W, in the presence of the polishing liquid (e.g., slurry) between the heat exchanger 11 and the surface of the polishing pad 3, the heating fluid and the cooling fluid flowing through the heat exchanger 11 perform the heat exchange with the polishing pad 3, whereby the pad surface temperature is controlled. The polishing apparatus having the above-discussed heat exchanger 11 can polish a substrate, such as a wafer, to achieve a uniform polishing profile.

The fluid flowing through the heating-fluid line HFL including the heating-flow passage formed inside the heat exchanger 11 may leak from the heating-fluid line HFL due to a cause, such as damage to the heating-fluid line HFL (e.g., damage to the heat exchanger 11). Similarly, the fluid flowing through the cooling-fluid line CFL including the cooling-flow passage formed inside the heat exchanger 11 may leak from the cooling-fluid line CFL due to a cause, such as damage of the cooling-fluid line CFL. When the wafer W is polished with the heating fluid and/or the cooling fluid leaked from the heating-fluid line HFL and/or the cooling-fluid line CFL attached to the surface 3a of the polishing pad 3, the polishing rate of the wafer W may be lowered and/or the wafer W may be contaminated.

From this viewpoint, as shown in FIG. 1, the polishing apparatus includes a leak detection system 200 for detecting a fluid leak from the heating-fluid line HFL and the cooling-fluid line CFL. In this embodiment, the leak detection system 200 is configured as a system to detect a fluid leak from the heating-fluid line HFL extending from the first supply valve SV1 to the first return valve RV1 and to detect a fluid leak from the cooling-fluid line CFL extending from the second supply valve SV2 to the second return valve RV2.

The leak detection system 200 includes a leak detection line 201 coupled to a fluid supply source (not shown) for holding a fluid for detecting the fluid leak. The fluid to be supplied from the fluid supply source to the leak detection line 201 is, for example, pure water. The leak detection line 201 includes a main line 201a extending from the fluid supply source, a first coupling line 201b branching off from the main line 201a and coupled to the heating-fluid line HFL, and a second coupling line 201c branching off from the main line 201a and coupled to the cooling-fluid line CFL.

A flow-rate control valve 205, which is a flow-rate regulating device capable of regulating a flow rate of the fluid flowing through the leak detection line 201, is disposed in the main line 201a. An example of the flow-rate control valve 205 includes a mass flow controller. The flow-rate control valve 205 is coupled to the operation controller 40, so that the operation controller 40 controls an operation of the flow-rate control valve 205 to control the flow rate of the fluid flowing through the leak detection line 201.

A flow meter 203 for measuring the flow rate of the fluid flowing through the leak detection line 201 is further disposed in the main line 201a. The flow meter 203 is located upstream of the first coupling line 201b and the second coupling line 201c. The flow meter 203 is configured to transmit a measured value of the flow rate to the operation controller 40.

The first coupling line 201b branches off from the main line 201a at a location downstream of the flow meter 203, and is coupled to the heating-fluid supply line HFL1 at a location between the first supply valve SV1 and the heat exchanger 11. In one embodiment, the first coupling line 201b may be coupled to the heating-fluid return line HFL2 at a location between the first return valve RV1 and the heat exchanger 11.

The second coupling line 201c branches off from the main line 201a at a location downstream of the flow meter 203, and is coupled to the cooling-fluid supply line CFL1 at a location between the second supply valve SV2 and the heat exchanger 11. In one embodiment, the second coupling line 201c may be coupled to the cooling-fluid return line CFL2 at a location between the second return valve RV2 and the heat exchanger 11.

The leak detection system 200 includes a first on-off valve 202A disposed in the first coupling line 201b. The first on-off valve 202A is coupled to the operation controller 40. Further, the leak detection system 200 includes a second on-off valve 202B disposed in the second coupling line 201c. The second on-off valve 202B is coupled to the operation controller 40. The first on-off valve 202A and the second on-off valve 202B are actuator-driven valves, such as electric-motor driven valves, solenoid valves, or air-operated valves.

The operation controller 40 is also coupled to the first supply valve SV1, the second supply valve SV2, the first return valve RV1, the second return valve RV2, the first drain valve DV1, the second drain valve DV2, the first flow control valve R1, the second flow control valve R2, the first flow meter FM1, and the second flow meter FM2. These valves SV1, SV2, RV1, RV2, DV1, and DV2 are also actuator-driven valves, such as electric-motor driven valves, solenoid valves, or air-operated valves.

The leak detection line 201 further includes a third coupling line 201d branching off from the main line 201a and coupled to the heating-fluid line HFL. The third coupling line 201d branches off from the main line 201a at a location between the flow meter 203 and the flow-rate control valve 205, and is coupled to the heating-fluid supply line HFL1 at a location between the first supply valve SV1 and the heat exchanger 11. The third coupling line 201d is located upstream of the first coupling line 201b and the second coupling line 201c. A third on-off valve 210, which is configured to open and close a flow passage of the third coupling line 201d, is disposed in the third coupling line 201d. The operation controller 40 is coupled to the third on-off valve 210, and is configured to be able to control the opening and closing operations of the third on-off valve 210. The third on-off valve 210 is an actuator-driven valve, such as an electric-motor driven valve, a solenoid valve, or an air-operated valve.

The third coupling line 201d is a fluid line for supplying a fluid from the leak detection line 201 to the heating-fluid line HFL in order to lower a temperature of the heating-fluid line HFL. As described above, when the wafer W is polished by the polishing apparatus, the heating fluid is supplied to the heat exchanger 11, and as a result, the temperature of the heating-fluid line HFL rises. Therefore, if an operator touches the high-temperature heating-fluid line HFL during maintenance of the polishing apparatus, the operator may get burned. In order for the operator to safely perform maintenance of the polishing apparatus, the operation controller 40 opens the third supply valve 210 to supply the fluid to the heating-fluid line HFL via the third coupling line 201d. At this time, the operation controller 40 closes the first supply valve SV1 and the first return valve RV1, and opens the first drain valve DV1. As a result, the heating fluid in the heating-fluid line HFL is replaced by the low-temperature fluid flowing through the leak detection line 201, so that the temperature of the heating-fluid line HFL can be quickly lowered.

In this embodiment, the operation controller 40 is configured to perform a fluid leak detecting operation (a first leak detecting operation) on the heating-fluid line HFL, and a fluid leak detecting operation (a second leak detecting operation) on the cooling-fluid line CFL. The operation controller 40 separately performs the first leak detecting operation and the second leak detecting operation. Since the second leak detecting operation is the same as the first leak detecting operation, the first leak detecting operation will be described below.

Figure 2:
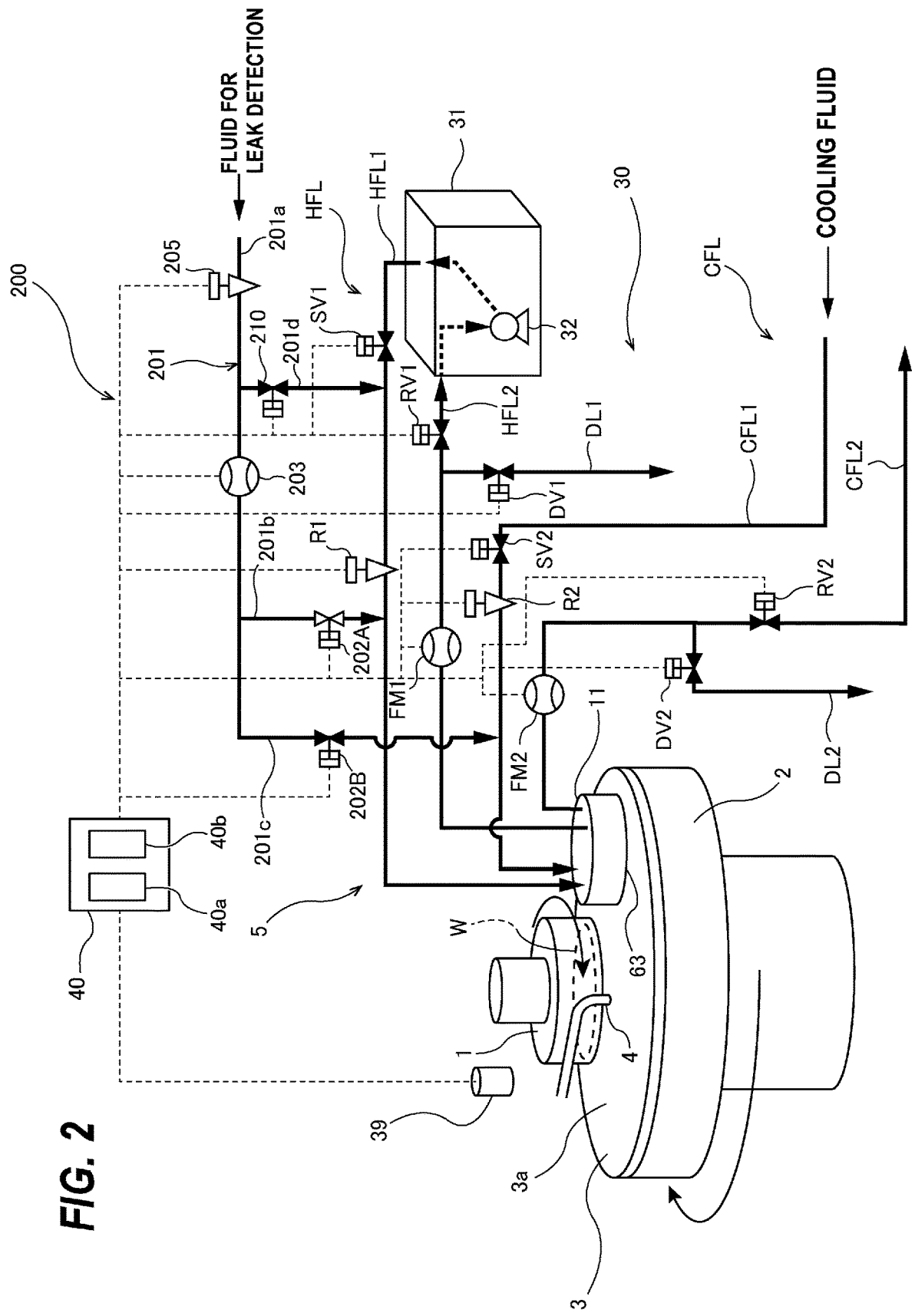
FIG. 2 is a schematic diagram of opened/closed states of valves in a first leak detecting operation.

FIG. 2 is a schematic diagram showing opened and closed states of the valves in the first leak detecting operation. In FIG. 2, white-colored valves indicate opened valves, and black-colored valves indicate closed valves. The first leak detecting operation is performed when the polishing process is not performed. Specifically, the operation controller 40 instructs the polishing head 1 to separate the wafer W from the polishing pad 3, closes the supply valves SV1 and SV2 and the return valves RV1 and RV2, and opens the first on-off valve 202A. The second on-off valve 202B, the third on-off valve 210, and the drain valves DV1 and DV2 remain closed. In this state, the operation controller 40 starts the first leak detecting operation.

Figure 3:
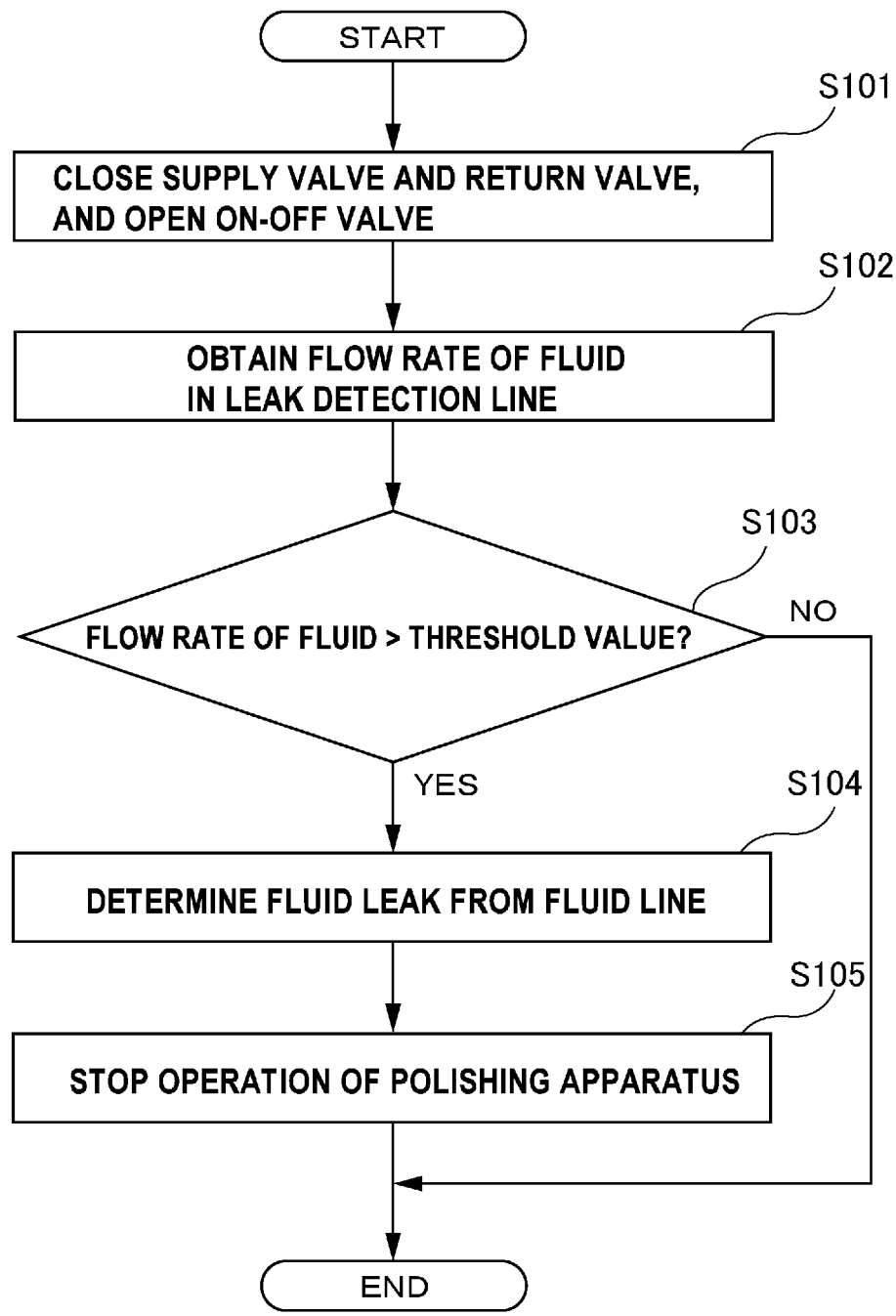
FIG. 3 is a flow chart illustrating the first leak detecting operation.

FIG. 3 is a flowchart showing the first leak detecting operation. The operation controller 40 closes the supply valves SV1 and SV2 and the return valves RV1 and RV2, and opens the first on-off valve 202A (step S101). At the same time as or after the first on-off valve 202A is opened, the operation controller 40 obtains a measured value of the flow rate of the fluid in the leak detection line 201 from the flow meter 203 (step S102), and starts monitoring of the flow rate of the fluid in the leak detection line 201. The flow meter 203 disposed in the leak detection line 201 has a measuring accuracy higher than a measuring accuracy of the first flow meter FM1 disposed in the heating-fluid supply line HFL1.

In this embodiment, the flow meter 203 is a micro flow meter capable of detecting a minute flow rate. If the flow rate of the heating fluid normally flowing through the heating-fluid line HFL is about 6 l/min, the micro flow meter is configured to be able to measure the flow rate of the fluid in the range of 0.2 ml/min to 2.0 ml/min, for example.

Next, the operation controller 40 starts comparing the obtained flow rate of the fluid with a predetermined threshold value (step S103) after a predetermined time (hereinafter, referred to as "delay time") has elapsed since the first on-off valve 202A was opened. Immediately after the first on-off valve 202A was opened, the flow rate of the fluid in the leak detection line 201 is expected to increase rapidly. Therefore, the operation controller 40 may not be able to accurately detect the leakage. For this reason, the delay time is provided for the increase in the flow rate to subside. The operation controller 40 is configured to start comparing the obtained flow rate of the fluid with the predetermined threshold value after the delay time has elapsed.

When the flow rate is higher than the predetermined threshold value ("YES" in step S103), the operation controller 40 determines a fluid leak from the heating-fluid line HFL (step S104). In this case, the operation controller 40 issues a leak alarm, and stops the operation of the polishing apparatus (step S105). When the flow rate of the fluid is equal to or lower than the predetermined threshold value ("NO" in step S103), the operation controller 40 terminates the first leak detecting operation, and then the operation controller 40 performs the fluid leak detecting operation on the cooling-fluid line CFL, i.e., the second leak detecting operation.

In one embodiment, the operation controller 40 may determine a fluid leak from the heating-fluid line HFL when the flow rate of the fluid is higher than the predetermined threshold value for a predetermined period of time (e.g., 5 seconds). This predetermined period of time is determined based on, for example, experimentation.

The second leak detecting operation for detecting a fluid leak from the cooling-fluid line CFL is performed in the same manner as the first leak detecting operation. Specifically, the operation controller 40 closes the first on-off valve 202A, opens the second on-off valve 202B, and then performs the second leak detecting operation in the same manner as the flowchart in FIG. 3. In one embodiment, the operation controller 40 may perform the first leak detecting operation and the second leak detecting operation simultaneously. In that case, the operation controller 40 opens both the first on-off valve 202A and the second on-off valve 202B, and then performs the second leak detecting operation in the same manner as the flowchart in FIG. 3.

Next, an inspection method for a defect of the leak detection system 200 itself will be described. Examples of the defect of the leak detection system 200 include, but are not limited to, a fluid leak from the leak detection line 201 and a failure of the flow meter 203.

Figure 4:
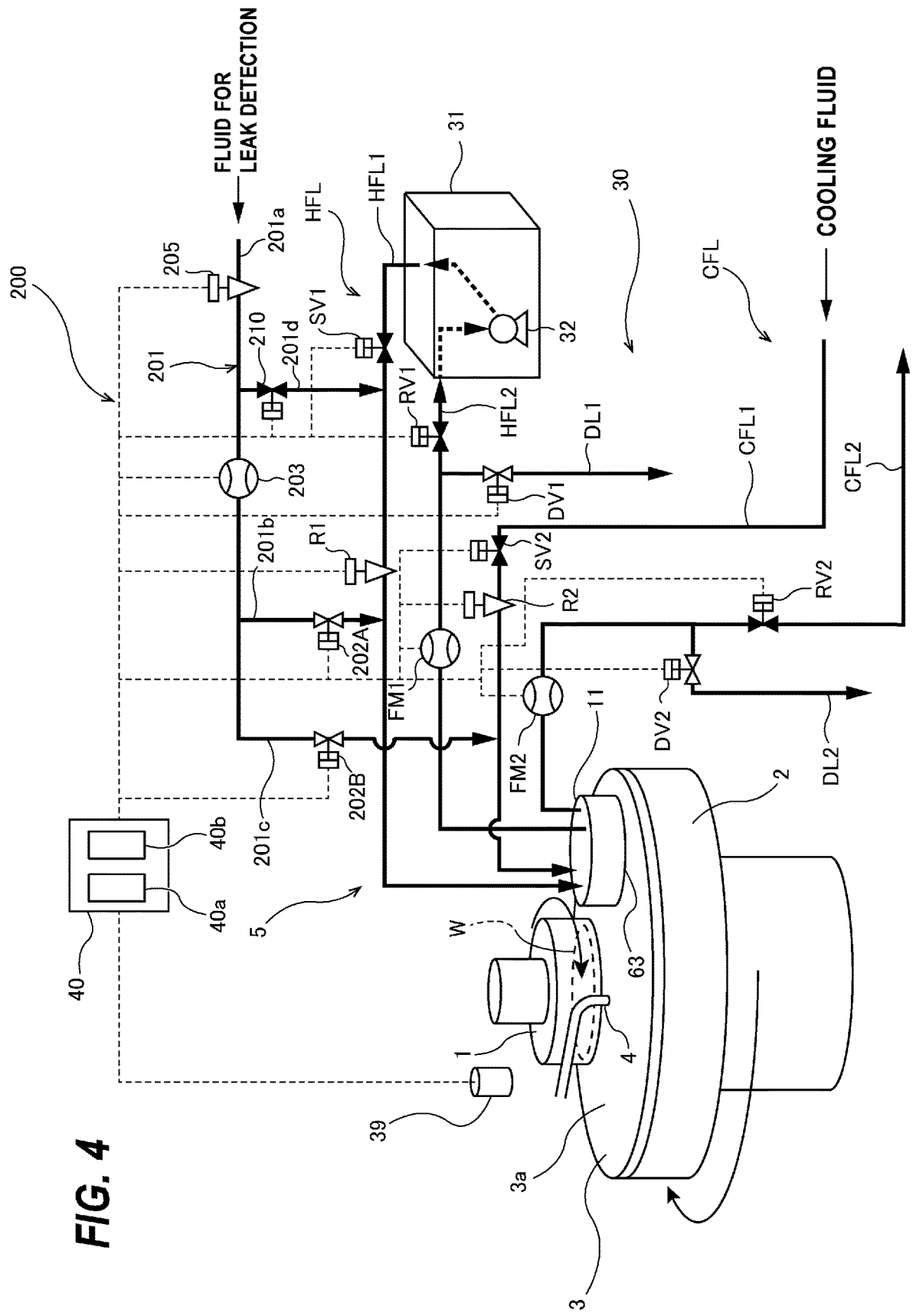
FIG. 4 is a schematic diagram of opened/closed states of valves during an inspection of a leak detection system.

FIG. 4 is a schematic diagram showing opened/closed states of the valves during an inspection of the leak detection system 200. In FIG. 4, white-colored valves indicate opened valves, and black-colored valves indicates closed valves. As shown in FIG. 4, the operation controller 40 closes the supply valves SV1 and SV2 and the return valves RV1 and RV2, and opens the first on-off valve 202A and the second on-off valve 202B. The third on-off valve 210 remains closed. Further, the operation controller 40 opens the first drain valve DV1 and the second drain valve DV2. The fluid (e.g., pure water) flows through the leak detection line 201, fills the heating-fluid line HFL and the cooling-fluid line CFL including the heat exchanger 11, and is drained through the first drain line DL1 and the second drain line DL2.

The operation controller 40 obtains a measured value of the flow rate of the fluid in the leak detection line 201 from the flow meter 203, and starts comparing the obtained flow rate of the fluid with a predetermined reference value. If the leak detection system 200 has no defect, the flow rate measured by the flow meter 203 corresponds to the flow rate of the fluid drained through the first drain line DL1 and the second drain line DL2, and its flow rate is represented by an expected value. In contrast, if the leak detection system 200 has a defect, the flow rate measured by the flow meter 203 cannot reach the expected value. For example, if the fluid leaks from the leak detection line 201 or if the flow meter 203 itself has a defect, the flow rate measured by the flow meter 203 is lower than the expected value.

Therefore, when the flow rate measured by the flow meter 203 is lower than the predetermined reference value, the operation controller 40 determines that the leak detection system 200 has a defect. In this case, the operation controller 40 issues an alarm and stops the operation of the polishing apparatus. When the flow rate of the fluid is equal to or higher than the predetermined reference value, the operation controller 40 terminates the inspection of the leak detection system 200.

Figure 5:
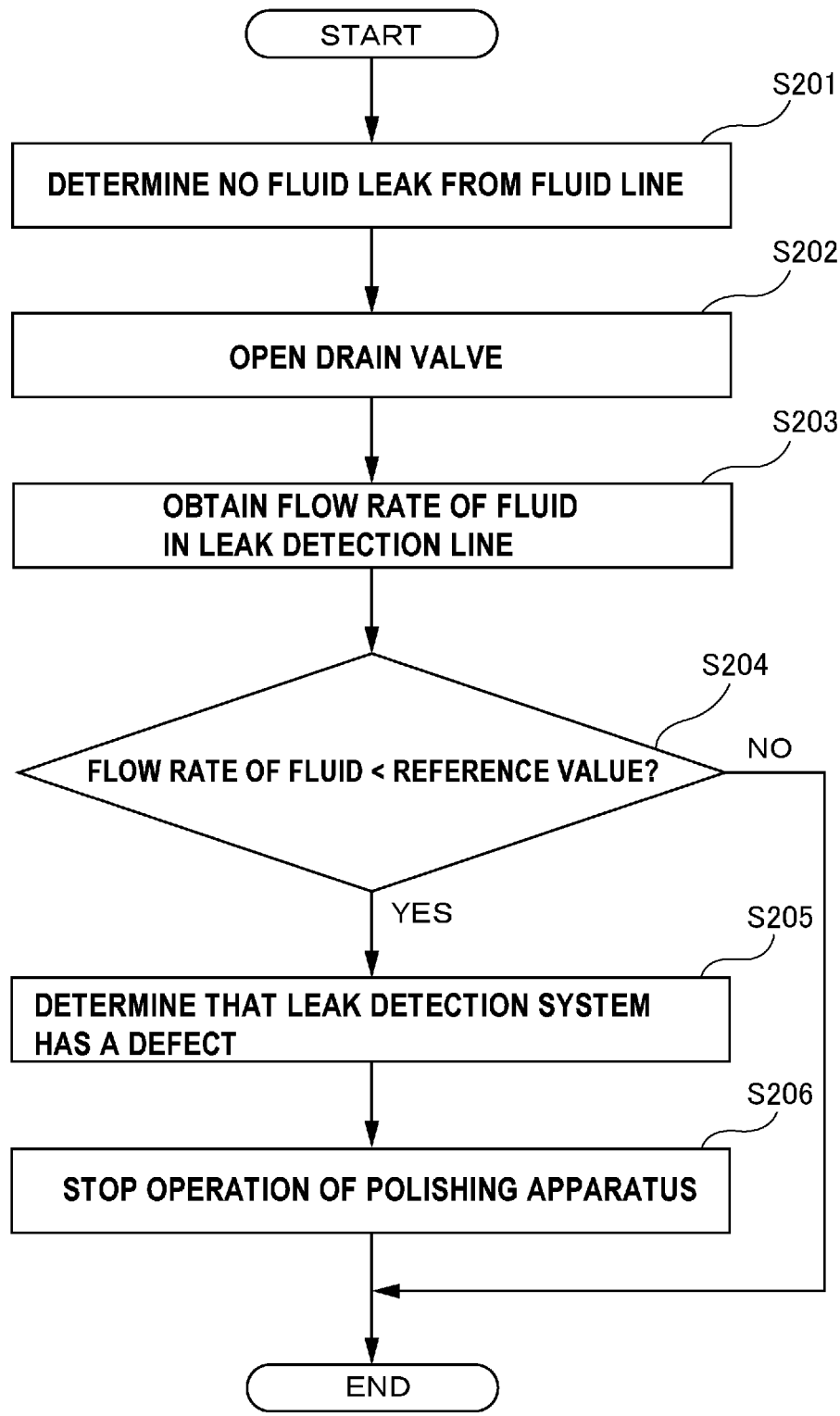
FIG. 5 is a flow chart illustrating an embodiment of an inspection of the leak detection system.

FIG. 5 is a flow chart illustrating an embodiment of an inspection of the leak detection system 200. As shown in FIG. 5, in this embodiment, the operation controller 40 performs the first leak detecting operation and the second leak detecting operation described above before the inspection of the leak detection system 200, and determines that there is no fluid leak from the heating-fluid line HFL and the cooling-fluid line CFL (step S201).

Subsequently, the operation controller 40 opens the first drain valve DV1 and the second drain valve DV2 (step S202), with the first on-off valve 202A and the second on-off valve 202B opened, and with the supply valves SV1, SV2, the return valves RV1, RV2, and the third on-off valve 210 closed. The fluid (e.g., pure water) flows through the leak detection line 201, fills the heating-fluid line HFL and the cooling-fluid line CFL including the heat exchanger 11, and is drained through the first drain line DL1 and the second drain line DL2.

The operation controller 40 obtains a measured value of the flow rate of the fluid in the leak detection line 201 from the flow meter 203 (step S203), and starts comparing the obtained flow rate of the fluid with a predetermined reference value (step S204). When the obtained flow rate is lower than the predetermined reference value ("YES" in step S204), the operation controller 40 determines that the leak detection system 200 has a defect (step S205). In this case, the operation controller 40 issues an alarm and stops the operation of the polishing apparatus (step S206). When the flow rate of the fluid is equal to or higher than the predetermined reference value ("NO" in step S204), the operation controller 40 terminates the inspection of the leak detection system 200.

If the predetermined reference value is too small (e.g., 1 ml/min), it is difficult to accurately detect the defect. Therefore, the predetermined reference value is set to, for example, 2 ml/min. Although this reference value is arbitrarily set, the reference value may be the same as the threshold value set in the first leak detecting operation and the second leak detecting operation described above. Alternatively, the reference value may be set to a value equal to or lower than the flow rate of the fluid flowing through the first drain line DL1 and the second drain line DL2 when the leak detection system 200 has no defect.

Figure 6:
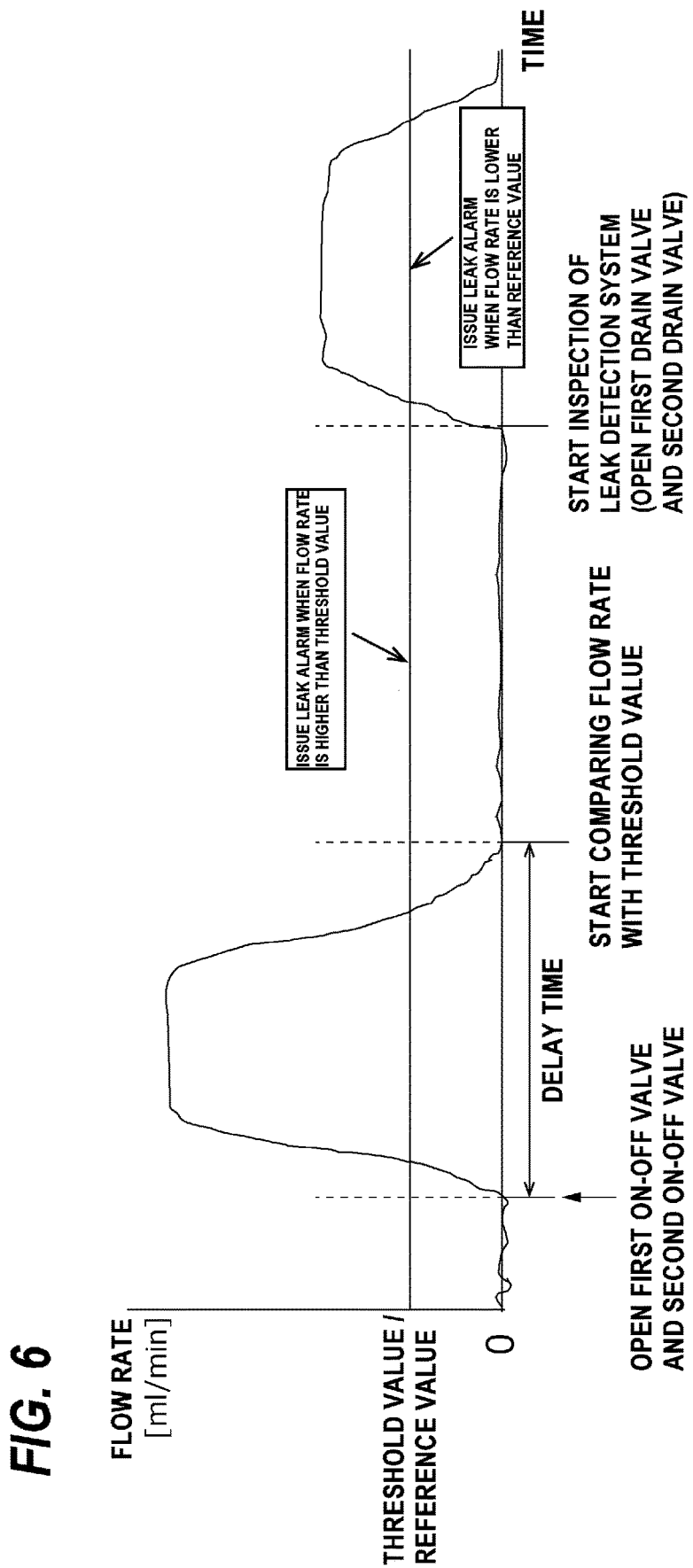
FIG. 6 is a graph showing change in flow rate when the leak detecting operation and the inspection of the leak detection system are performed successively.

FIG. 6 is a graph showing change in flow rate of the fluid in the leak detection line 201 when the fluid leak detecting operation and the inspection of the leak detection system 200 are performed successively. In the example shown in FIG. 6, the first leak detecting operation for the heating-fluid line HFL and the second leak detecting operation for the cooling-fluid line CFL are performed simultaneously. Subsequently, the inspection of the leak detection system 200 is performed according to the embodiment shown in FIGS. 4 and 5.

Specifically, the operation controller 40 opens the first on-off valve 202A and the second on-off valve 202B, with the supply valves SV1 and SV2 and the return valves RV1 and RV2 closed. Then, after the predetermined delay time has elapsed, the operation controller 40 starts comparing the flow rate with the threshold value. Further, the operation controller 40 opens the first drain valve DV1 and the second drain valve DV2, with the supply valves SV1, SV2 and the return valves RV1, RV2 closed, and with the first on-off valve 202A and the second on-off valve 202B opened. While the fluid is drained through the first drain line DL1 and the second drain line DL2, the operation controller 40 compares the flow rate of the fluid in the leak detection line 201 with the reference value.

In the above-described embodiment, the inspection of the leak detection system 200 is performed after no fluid leak from the heating-fluid line HFL and the cooling-fluid line CFL is confirmed. In one embodiment, only the inspection of the leak detection system 200 may be performed independently. Specifically, the operation controller 40 opens the first on-off valve 202A and the second on-off valve 202B, and opens the first drain valve DV1 and the second drain valve DV2, when the polishing process is not being performed. After that, the operation controller 40 obtains the measured value of the flow rate from the flow meter 203, and compares the flow rate with the predetermined reference value to determine whether or not the leak detection system 200 has a defect.

According to the embodiments described with reference to FIGS. 4 to 6, the leak detection system 200 can be inspected for the defect without the use of dedicated jigs, etc. Therefore, the inspection time of the leak detection system 200 can be shortened.

Figure 7:
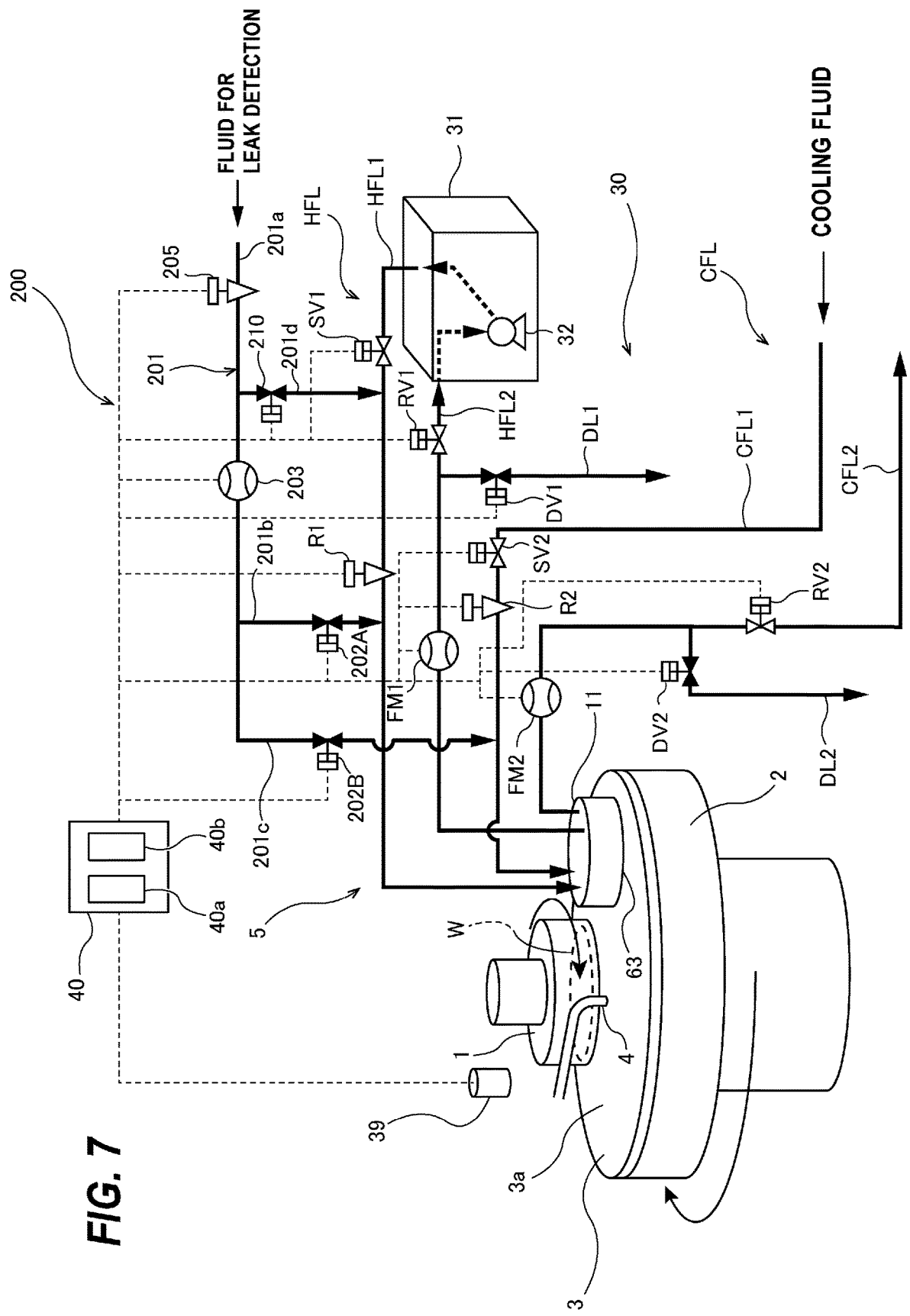
FIG. 7 is a schematic diagram showing opened/closed states of valves during an inspection of the leak detection system according to another embodiment.

FIG. 7 is a schematic diagram showing another embodiment of opened/closed states of valves during an inspection of the leak detection system 200. In FIG. 7, white-colored valves indicate opened valves, and black-colored valves indicate closed valves. Configurations and operations of this embodiment, which will not be particularly described, are the same as those of the above-described embodiments, and duplicated description will be omitted.

As shown in FIG. 7, the inspection of the leak detection system 200 is performed with the first on-off valve 202A and the second on-off valve 202B closed, and with the supply valves SV1 and SV2 and the return valves RV1 and RV2 opened. During the inspection of the leak detection system 200, the third on-off valve 210, the first drain valve DV1, and the second drain valve DV2 are closed. According to this embodiment, since the fluid does not flow from the leak detection line 201 to the heating-fluid line HFL and the cooling-fluid line CFL, the inspection of the leak detection system 200 can be performed while maintaining the pad-temperature regulating function.

Figure 8:
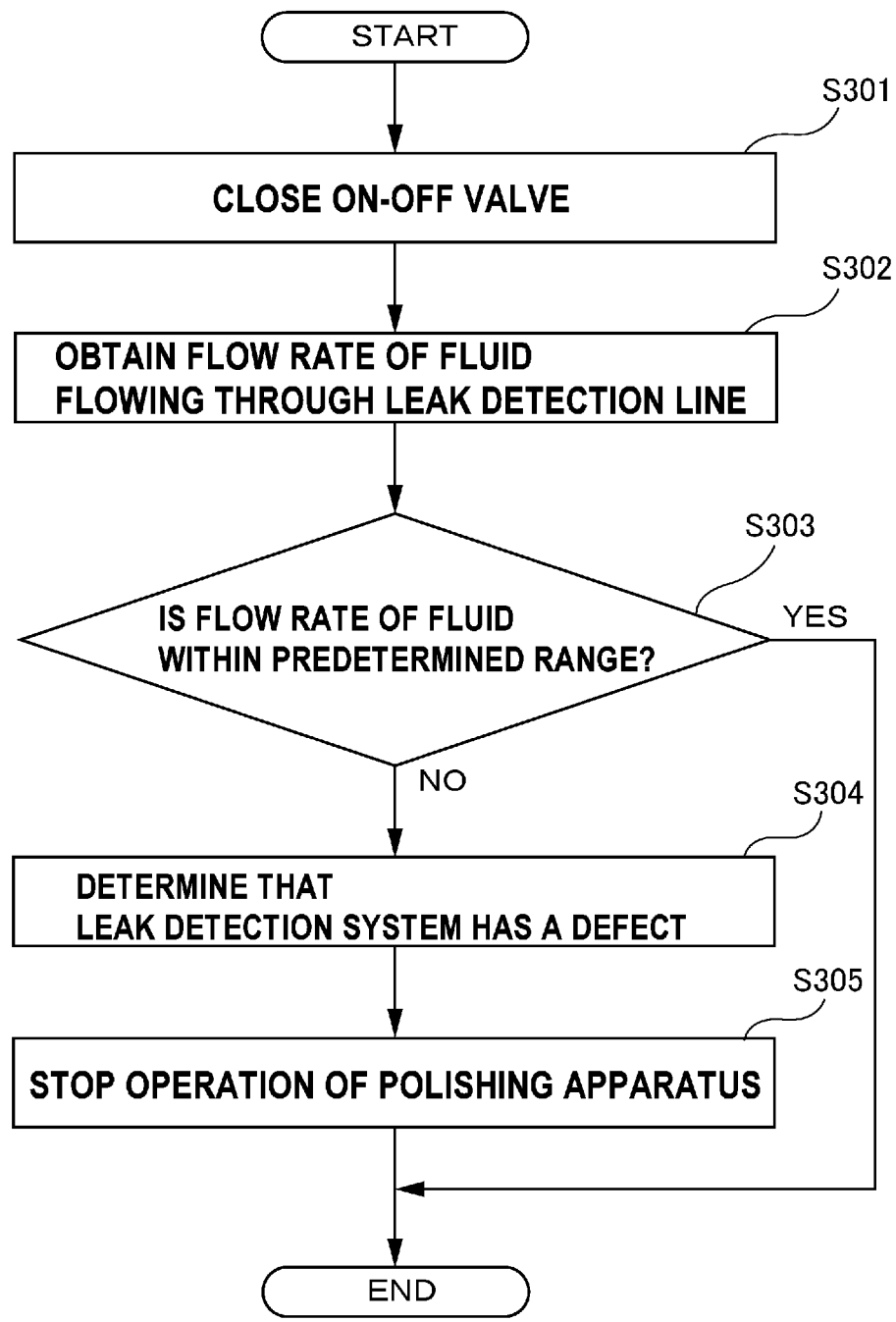
FIG. 8 is a flow chart illustrating the inspection of the leak detection system according to the embodiment shown in FIG. 7.

FIG. 8 is a flow chart illustrating the embodiment shown in FIG. 7 of the inspection of the leak detection system 200.

As shown in FIG. 8, the operation controller 40 closes the first on-off valve 202A and the second on-off valve 202B (step S301). Then, the operation controller 40 obtains a measured value of the flow rate of the fluid in the leak detection line 201 from the flow meter 203 (step S302), and determines whether or not the obtained flow rate of the fluid is within a predetermined range (step S303). When the obtained flow rate is out of the predetermined range ("NO" in step S303), the operation controller 40 determines that the leak detection system 200 has a defect (step S304). In this case, the operation controller 40 issues an alarm and at the same time stops the operation of the polishing apparatus (step S305). When the flow rate of the fluid is within the predetermined range ("YES" in step S303), the operation controller 40 terminates the inspection of the leak detection system 200.

Figure 9:
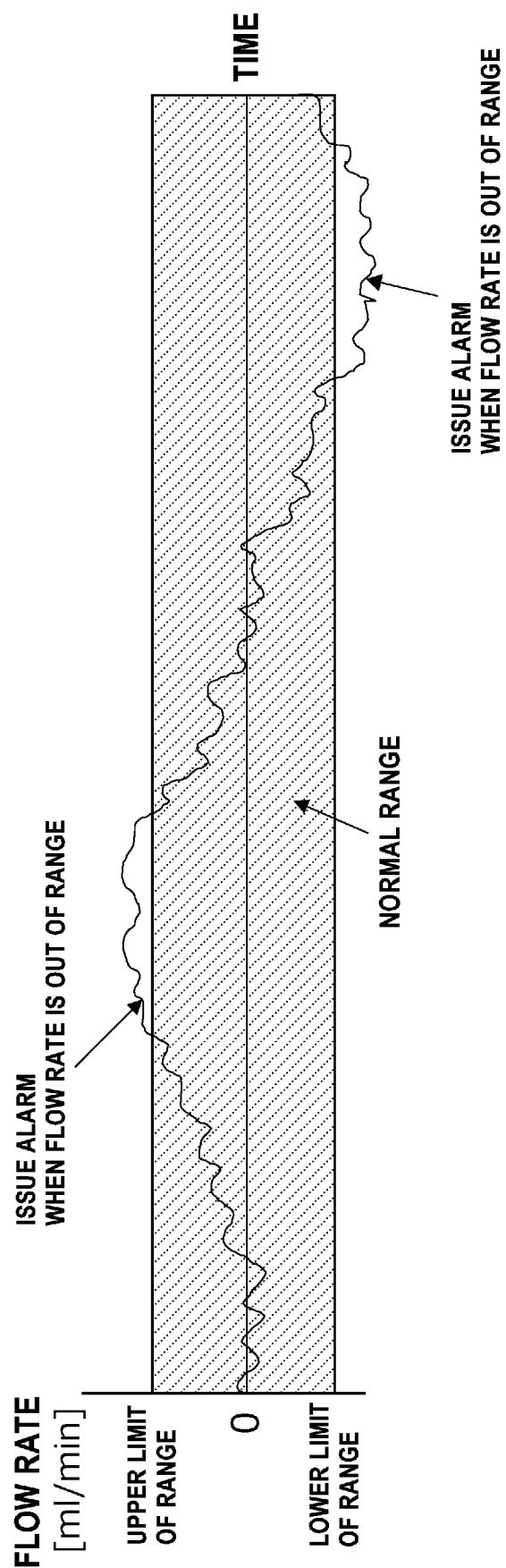
FIG. 9 is a graph showing change in flow rate during the inspection of the leak detection system.
Figure 10:
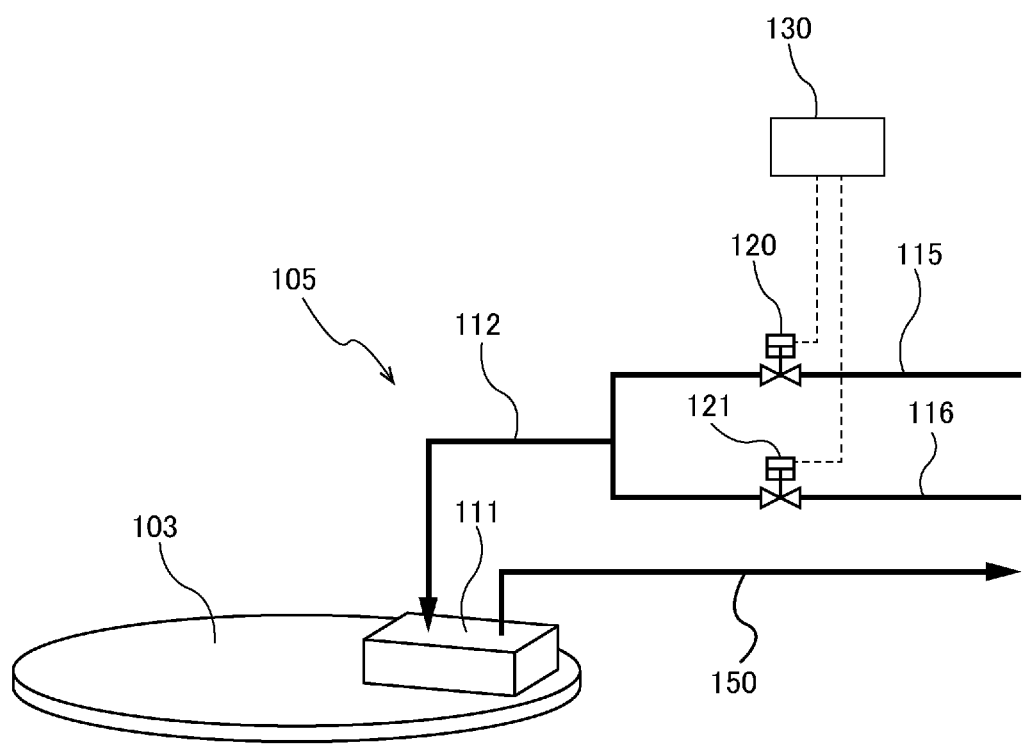
FIG. 10 is a schematic diagram showing an example of a conventional pad-temperature regulating apparatus.

FIG. 9 is a graph showing change in the flow rate during the inspection of the leak detection system 200. When the fluid leaks from the first coupling line 201b or the second coupling line 201c, the fluid flows in the main line 201a even if the first on-off valve 202A and the second on-off valve 202B are closed. When the measured value of the flow rate obtained from the flow meter 203 is out of the predetermined range, the operation controller 40 can determine that the fluid is leaking. As an example of the flow meter 203, in the case of the gear type, the flow meter 203 shows a negative value when the fluid flows from the downstream side to the upstream side. Depending on the state of the defect, the fluid may flow from the downstream side to the upstream side, and therefore the predetermined range may be set to any range including zero. Although the gear type is mentioned as the example of the flow meter 203, the present invention is not limited to this embodiment. In one embodiment, a thermal or ultrasonic flow meter may be used.

In the embodiment described with reference to FIGS. 7 to 9, the leak detection system 200 can be inspected for a defect without stopping the pad-temperature regulating function and without using a dedicated jig, etc. Therefore, the inspection time of the leak detection system 200 can be shortened. In addition, since the inspection can be performed even during the polishing process, a less work load is needed.

In the above-described embodiments, the inspection method for the system to check the fluid leak from the heating-fluid line HFL and the cooling-fluid line CFL of the pad-temperature regulating system 5 has been described, while the present invention is not limited to these embodiments. The present invention is applicable to all types of systems each having a fluid line through which a fluid flows, and a supply valve and a return valve disposed in the fluid line. For example, the fluid leak detection method according to the above-described embodiments may be used for checking oil leak from a fluid line through which oil is supplied to a press machine. The oil supplied to the press machine is used, for example, for an actuator, such as a hydraulic cylinder for moving a die. Alternatively, the fluid leak detection method according to the above-described embodiments may be used for checking leak of a refrigerant from a fluid line through which the refrigerant of a chiller flows. The fluid flowing through the fluid line is not limited to a liquid or a gas.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. An inspection method for use in a leak detection system configured to detect a fluid leak from a fluid line, the leak detection system including:
   a leak detection line coupled to the fluid line extending between a supply valve and a return valve;
   an on-off valve attached to the leak detection line;
   a flow meter configured to measure a flow rate of fluid flowing through the leak detection line;
   an operation controller configured to detect the fluid leak from the fluid line based on a first flow rate measured by the flow meter;
   a drain line communicating with the fluid line and the leak detection line, the drain line being located downstream of the flow meter; and
   a drain valve attached to the drain line, the method comprising:
   measuring a second flow rate of a fluid in the leak detection line of the leak detection system by the flow meter; and
   determining that the leak detection system has a defect when the second flow rate is lower than a predetermined reference value.

2. The inspection method according to claim 1, wherein the predetermined reference value is equal to or lower than a flow rate of the fluid flowing through the drain line when the leak detection system has no defect.

3. The inspection method according to claim 1, wherein: the inspection method is performed after the leak detection system is determined to have no fluid leak from the fluid line; and the leak detection system is configured to: close the supply valve, the return valve, and the drain valve; open the on-off valve; measure the first flow rate by the flow meter; and determine no fluid leak from the fluid line when the first flow rate is equal to or lower than a predetermined threshold value.

4. The inspection method according to claim 1, wherein:
   the fluid line includes a heat exchanger;
   the supply valve is located upstream of the heat exchanger; and
   the return valve is located downstream of the heat exchanger.

5. The inspection method according to claim 4, wherein the heat exchanger is disposed on a polishing pad of a polishing apparatus.

6. A leak detection system for detecting a fluid leak from a fluid line, comprising:
   a leak detection line coupled to the fluid line extending between a supply valve and a return valve;
   an on-off valve attached to the leak detection line;
   a flow meter configured to measure a flow rate of fluid flowing through the leak detection line;
   an operation controller configured to detect the fluid leak from the fluid line based on a first flow rate measured by the flow meter;
   a drain line communicating with the fluid line and the leak detection line, the drain line being located downstream of the flow meter; and
   a drain valve attached to the drain line,
   the operation controller being configured to:
      close the supply valve and the return valve;
      open the on-off valve and the drain valve;
      obtain, from the flow meter, a measured value of a second flow rate of fluid in the leak detection line; and
      determine that the leak detection system has a defect when the second flow rate is lower than a predetermined reference value.

7. The leak detection system according to claim 6, wherein the predetermined reference value is equal to or lower than the flow rate of the fluid flowing through the drain line when the leak detection system has no defect.

8. The leak detection system according to claim 6, wherein the operation controller is configured to:
   close the supply valve, the return valve, and the drain valve;
   open the on-off valve;
   obtain, from the flow meter, a measured value of the first flow rate of fluid in the leak detection line;
   determine no fluid leak from the fluid line when the first flow rate is equal to or lower than a predetermined threshold value; then
   open the drain valve, with the supply valve and the return valve closed, and with the on-off valve opened;
   obtain, from the flow meter, a measured value of the second flow rate of fluid in the leak detection line; and
   determine that the leak detection system has a defect when the second flow rate is lower than the predetermined reference value.

9. The leak detection system according to claim 6, wherein:
   the fluid line includes a heat exchanger;
   the supply valve is located upstream of the heat exchanger; and
   the return valve is located downstream of the heat exchanger.

10. The leak detection system according to claim 9, wherein the heat exchanger is disposed on a polishing pad of a polishing apparatus.

* * * * *